(12) United States Patent
Kneppe et al.

(10) Patent No.: US 7,107,891 B2
(45) Date of Patent: Sep. 19, 2006

(54) HIGH-SPEED SHEAR FOR TRANSVERSELY CUTTING ROLLED STRIP

(75) Inventors: Günter Kneppe, Hilchenbach (DE); Jochen Münker, Kreuztal (DE); Jürgen Merz, Kreuztal (DE); Horst Grafe, Hilchenbach (DE)

(73) Assignee: SMS Schloemann-Siemag Aktiengesellschaft, Düsseldorf (DE)

( * ) Notice: Subject to any disclaimer, the term of this patent is extended or adjusted under 35 U.S.C. 154(b) by 52 days.

(21) Appl. No.: 09/938,913

(22) Filed: Aug. 24, 2001

(65) Prior Publication Data

US 2002/0029677 A1    Mar. 14, 2002

(30) Foreign Application Priority Data

Oct. 22, 1997    (DE)    ................ 197 46 528

(51) Int. Cl.
  B26D 1/62    (2006.01)
  B65H 29/54    (2006.01)
(52) U.S. Cl. ................ 83/663; 83/37; 83/347; 83/669; 83/698.21
(58) Field of Classification Search ............... 83/23, 83/116, 117, 118, 119, 120, 346, 305, 344, 83/582, 663, 304, 673; 492/42, 48
See application file for complete search history.

(56) References Cited

U.S. PATENT DOCUMENTS

| | | | | |
|---|---|---|---|---|
| 1,466,001 A | * | 8/1923 | Metzner et al. ........... | 83/101 |
| 2,801,439 A | * | 8/1957 | Meares ................. | 18/2 |
| 4,771,665 A | * | 9/1988 | Van Doorn et al. ....... | 83/62.1 |
| 4,962,683 A | * | 10/1990 | Scheffer et al. ........ | 83/103 |
| 5,048,387 A | * | 9/1991 | Niitsuma et al. ........ | 83/344 |
| 5,207,138 A | * | 5/1993 | Sato et al. ............ | 83/337 |
| 5,363,728 A | * | 11/1994 | Elsner et al. .......... | 83/23 |
| 5,398,575 A | * | 3/1995 | Rewitzer .............. | 83/72 |
| 6,772,663 B1 | * | 8/2004 | Machamer ............ | 83/37 |
| 2002/0184984 A1 | * | 12/2002 | Rosenthal et al. ........ | 83/305 |

FOREIGN PATENT DOCUMENTS

EP    576005    * 6/1993

* cited by examiner

Primary Examiner—Minh Trinh
(74) Attorney, Agent, or Firm—Friedrich Kueffner

(57) ABSTRACT

A high-speed shear with a knife, particularly a chisel-type knife with a knife edge, arranged on at least one of two oppositely arranged drums, wherein the knife can be accelerated to the feeding speed of the rolled strip and the drums can be adjusted relative to each other for carrying out a cut. At least one drive unit provided for the drums serves to accelerate the drums to the speed of the rolled strip to be cut and at least one of the drums may be provided with a separately controllable adjusting device. The chisel-type knife of the knife drum is mounted so as to protrude from the cutting circle towards the anvil or the surface portion of the second drum acting as an anvil and to mount the chisel-type knife of the knife drum so as to be resiliently supported against a predetermined restoring force.

1 Claim, 6 Drawing Sheets

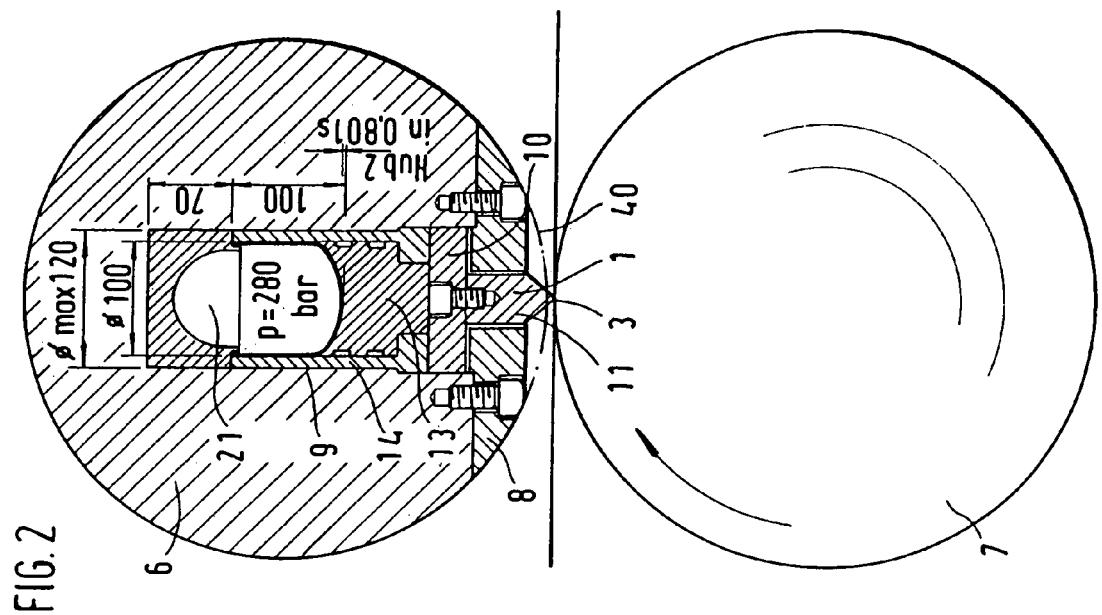
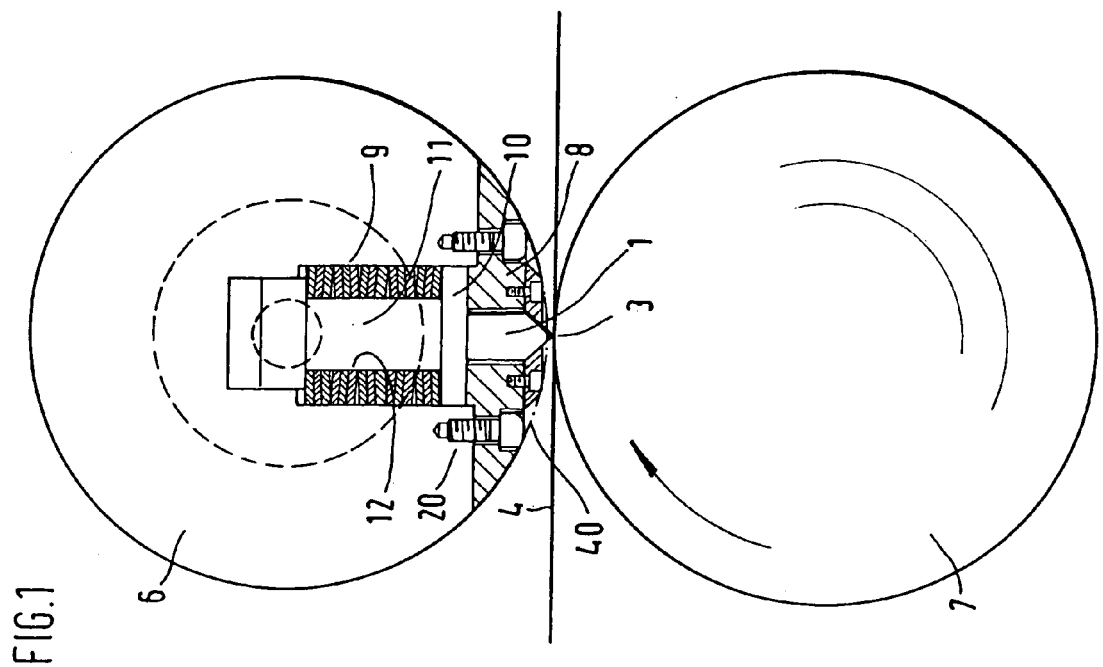

HIGH-SPEED SHEAR FOR TRANSVERSELY CUTTING ROLLED STRIP

BACKGROUND OF THE INVENTION

1. Field of the Invention

The present invention relates to a high-speed shear with a knife, particularly a chisel-type knife with a knife edge, arranged on at least one of two oppositely arranged drums, wherein the knife can be accelerated to the feeding speed of the rolled strip and the drums can be adjusted relative to each other for carrying out a cut. At least one drive unit provided for the drums serves to accelerate the drums to the speed of the rolled strip to be cut and at least one of the drums may be provided with a separately controllable adjusting device.

2. Description of the Related Art

In the manufacture of hot-rolled wide strip, the endless rolling method is used more and more. The material used is produced by welding preliminary strips or in casting machines. However, hot-rolled wide strip is also manufactured by using a semi-endless rolling method in which the material used may have the length of several preliminary strips which may be stored intermediately on roller tables, roller-hearth furnaces or in coil boxes.

After the hot-rolling procedure, the finished strip must be cut to the strip lengths corresponding to the required coil weights. The cut should be carried out in a continuous operation, i.e., at rolling speed. Accordingly, the cut must be carried out at the speeds of trains for hot-rolling wide strip which are conventional today in the range of 5 m/sec. to 30 m/sec., preferably 10 m/sec. to 20 m/sec. The strip thicknesses are between 0.5 mm to 30 mm, preferably between 0.6 mm to 1.5 mm.

Rotary shears or guillotine shears which are conventional in the art and serve to cut hot-rolled wide strip, are not designed for such high strip speeds. However, flying shears which are used following cold-rolling tandem trains usually operate today only at strip speeds of about 6 m/sec; in these type of shears there is also a demand for significantly higher speeds.

At such high strip speeds, it is no longer possible to economically carry out the conventional cutting procedures in which the knife drum is accelerated to a strip speed of up to 30 m/sec. for carrying out the cut and in which the knife drum must subsequently be decelerated again.

In order to eliminate these difficulties, it has already been proposed to control the acceleration of the knife drum to strip speed or the operation of the knife drum at strip speed separate of the movement to be carried out perpendicularly of the strip and to provide for at least one of the drums a separately controllable adjusting device.

In this connection, it is possible to provide one of the drums with a knife and the other drum with an anvil or a surface portion acting as an anvil which interacts with the knife.

However, when the shear has this configuration, a safe and exact cut can only be ensured if the cutting gap between the knife cutting edge and the anvil or the surface portion of the counter-drum is zero. If this is not the case, for example, if the knife has an excess length, the knife and the anvil may be overloaded until they are destroyed, or when the knife has an insufficient length the cut remains incomplete.

However, due to one or more interacting variables including thermal extension, wear, elastic behavior of the adjusting devices, acceleration forces, finishing tolerances, etc. the adjustment of the cutting gap to "zero" cannot be achieved with the required certainty. Therefore, it is necessary for a certain and reliable cutting of the strip that the knife protrudes from the cutting circle. However, this protrusion leads to a rapid increase of the cutting forces and, thus, to wear phenomena in all structural components of the cutting elements, the adjusting device and the bearings of the drums.

SUMMARY OF THE INVENTION

Therefore, starting from the prior art discussed above, it is the primary object of the present invention to further develop a high-speed shear for cutting hot-rolled and cold-rolled strip while avoiding the aforementioned difficulties and technical limits in such a way that exact cuts are safely ensured at strip speeds of up to 30 m/sec., even in the case of minimum strip thicknesses. This is to be achieved while avoiding an overloading of knife, and/or of the surface portion of the counter-drum, of the adjusting mechanisms and the bearings of the drum, and/or to avoid an incomplete cut.

In accordance with the present invention, in a high-speed shear of the type described above, the chisel-type knife of the knife drum is mounted so as to protrude from the cutting circle towards the anvil or the surface portion of the second drum acting as an anvil and to mount the chisel-type knife of the knife drum so as to be resiliently supported against a predetermined restoring force.

In accordance with a further development of the invention, the chisel-type knife is mounted so as to be resiliently supportive in a radial guide means of the knife drum. Instead of the radial guide means it can also be provided that the chisel-type knife is mounted so as to be resiliently supported on a link, wherein the point of rotation of the link is located on the knife drum.

In accordance with an alternative embodiment of the present invention, the chisel-type knife is clamped non-resiliently in the knife drum and the adjusting device which supports the knife drum with its bearing is mounted so as to be resiliently supported relative to a predeterminable restoring force.

Both technical solutions achieve the same result, namely the knife which initially protrudes out of the cutting circle can yield during the cutting process when meeting the anvil, or the surface of the second drum serving as an anvil, to such an extent that an impermissible increase of the cutting forces and, thus, wear phenomena at all structural components of the cutting elements or adjusting device and including the bearings of the drum can be safely avoided.

In accordance with an embodiment of the invention, one of the drums is provided with a chisel-type knife and the other drum is equipped with an anvil interacting with the knife. However, alternatively it is also possible that one of the drums is equipped with a chisel-type knife which interacts with a surface portion of the second drum which acts as an anvil.

The present invention provides the result that the chisel-type knife meets the strip as the drum rotates, the knife cuts the strip and makes contact with the anvil or the surface portion of the counter-drum acting as an anvil and subsequently yields or resiliently moves back.

The interaction between the chisel-type knife and the anvil drum provides the advantage that the synchronization of the circumferential speeds of both drums does not have to be particularly precise. On the contrary, in the case of a difference of the circumferential speeds of the chisel-type knife and the anvil drum, the entire circumference of the anvil drum can be utilized in the interaction of the knife so that a wear distribution is achieved and the availability of the shear is favorably improved.

Consequently, the principle described above is especially suitable for highest strip speeds in the rough operating conditions of hot rolling mills.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 1 is a side view, partially in section, showing a knife drum interacting with an anvil drum;

FIG. 2 is a side view, partially in section, of another embodiment with a knife drum interacting with an anvil drum;

DESCRIPTION OF THE PREFERRED EMBODIMENTS

Figure 5:
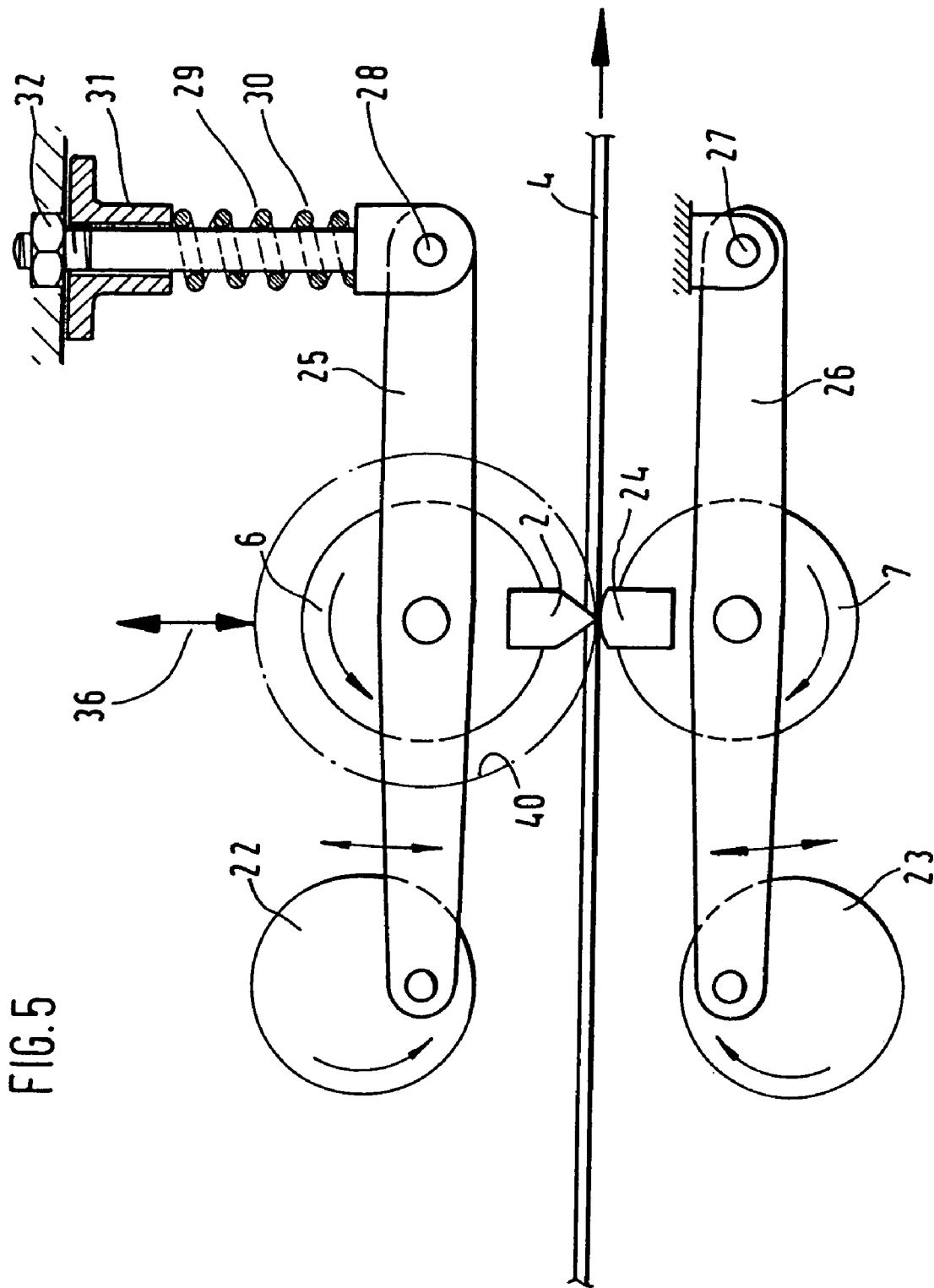
FIG. 5 is a side view of an adjusting device for the chisel-type knife and the anvil drum with resilient support of an adjusting beam.

FIG. 1 of the drawing shows a flying high-speed shear with knife drum 6 and an anvil drum 7 which interacts with the knife drum 6 for cutting a rolled strip 4. The two drums 6, 7 can be accelerated by means of a drive device, not shown, to the feeding speed of the rolled strip 4 to be cut and are adjustable relative to each other for performing a cut by means of an adjusting device 36 which is known in the art and is illustrated in FIG. 5. By means of such an adjusting device the two drums 6, 7 are accelerated independently of the adjusting procedure for carrying out a cut to a circumferential speed which corresponds to the feeding speed of the strip 4 to be cut and the two drums are maintained during the further duration of operation at this circumferential speed, while the adjustment for carrying out the cut is reversed immediately after a cut has been carried out into an open neutral position, so that a predetermined length of the strip can pass through the shear uncut.

In accordance with the present invention, the chisel-type knife 1 of the knife drum 6 is mounted so as to protrude out of the cutting circle 40 toward an anvil 24 shown in FIG. 5 or a surface portion of the drum 7 acting as an anvil and so as to be resiliently supported with a predeterminable restoring force against a steel spring stack 12. The chisel-type knife 1 may be resiliently supported in a radial guide means 9 of the knife drum 6. In the embodiment of the knife support according to FIG. 1 the radial guide means 9 receives the chisel-type knife 1 so as to be guided with its shaft 11 in radial direction. The shaft 11 has a flange 10 against which the steel spring stack 12 rests, so that the chisel-type knife 1 is resiliently supported in its protruding cutting position with a predetermined restoring force. The flange 10 is held by a locking element 8 in radial direction, wherein the locking element 8 is secured to the drum 6 by means of screws 20. In this manner, during the cutting process after the rolled strip 4 has been cut the chisel-type knife can be resiliently forced back against the force of the spring in the direction toward the drum center to such an extent that damage to the knife cutting edge 3 or the surface portion of the anvil drum 7 is avoided. The anvil drum 7 may be of relatively soft material in order to protect the chisel-type knife 1.

In FIGS. 1 and 2, the separately controllable adjusting device 36 is schematically indicated as a double arrow. The configuration of such an adjusting device is known in the art. FIG. 5 shows as an example an adjusting device 36 with links 25, 26 actuated by eccentric adjusting members 22, 23. FIG. 5 further shows an alternative embodiment of the invention in which the chisel-type knife 2 is non-resiliently mounted in the knife drum 6 and the adjusting device 36 receiving the knife drum 6 with its bearing is mounted so as to be resiliently supported with a predeterminable restoring force against a spring strut 29.

In this embodiment, the knife 2 can also resiliently yield out of the cutting circle 40 against the anvil 24 when a predetermined peak load has been reached, wherein the link 25 is lifted by a corresponding extent against the force of the spring 30 in order to avoid an overloading of knife 2, anvil 24 and all other structural components including the bearings of the drums 6 and 7.

Figure 3:
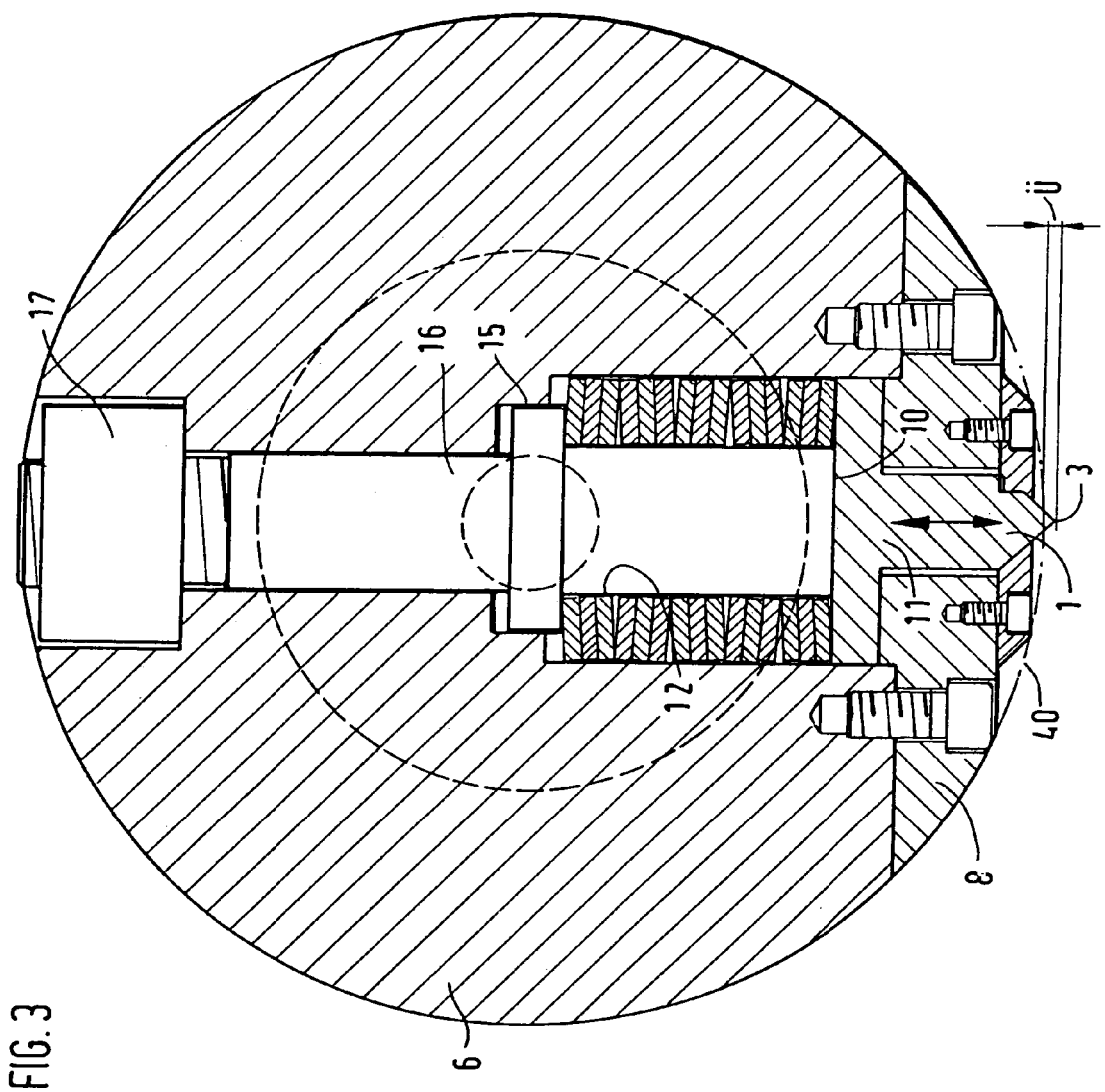
FIG. 3 is a sectional view, on a larger scale, perpendicularly of the axis of rotation of a knife drum with a resiliently supported chisel-type knife.

FIG. 3 shows the embodiment of the invention according to FIG. 1 on a larger scale. Equal elements are provided with the same reference numerals. FIG. 3 shows that the knife cutting edge 3 protrudes by a dimension Ü from the circular circumference of the knife drum 6. In this embodiment, in which the knife shaft 11 is supported resiliently against the steel spring stack 12, the knife shaft 11 is extended upwardly in the form of a pressure rod 16. The pressure plate 15 serves to limit the displacement distance which is schematically indicated by a double arrow in the knife shaft 11. The pressure rod 16 is screwed into a screw connection 17 which permits adjustment of the pretensioning force of the steel spring stack 12.

In accordance with a modified embodiment of the present invention as compared to that shown in FIGS. 1 and 3, FIGS. 2 and 4 show an embodiment in which the chisel-type knife 1 is mounted in the radial guide means 9 supported against a gas pressure spring 21. The gas pressure spring 21 transmits the pressure to the piston 13 which is guided in the cylinder 14 and which, in turn, transmits the predetermined cutting force of the chisel-type knife 1 through the flange 10 and the knife shaft 11 to the knife cutting edge 3. In principle, the different spring elements 12 and 21 are means which act in the same manner and which can be selected by those skilled in the art as desired.

Figure 4:
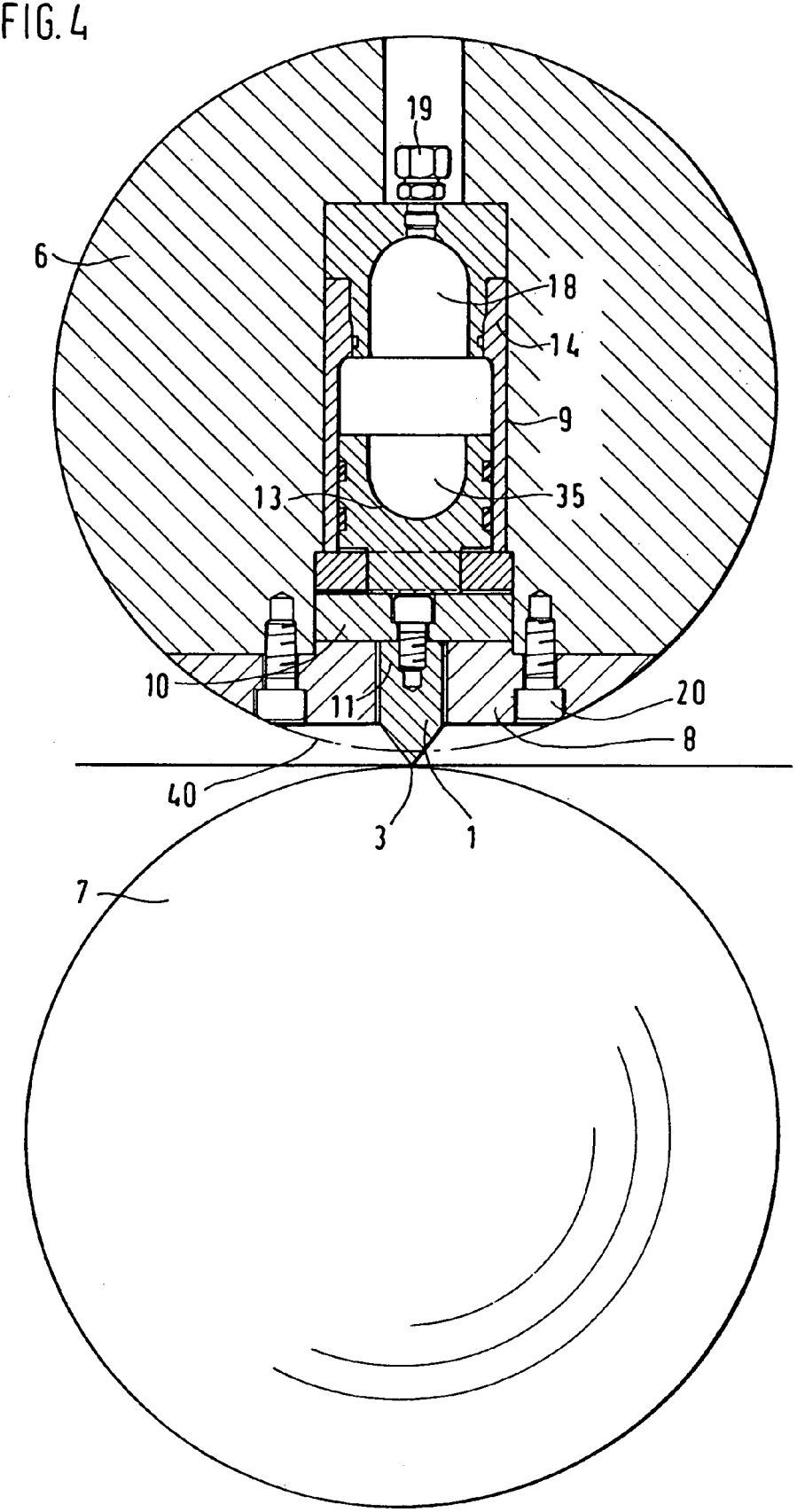
FIG. 4 is a sectional view, also on a larger scale, of a knife drum with a pneumatically/hydraulically supported chisel-type knife interacting with an anvil drum.

The enlarged illustration of FIG. 4 further shows a closing fitting 19 of the pressure space 18 through which the gas pressure or the loading of the pressure space 18 with pressurized gas can be adjusted and varied. The lower pressure space can optionally be charged with a hydraulic liquid 35 or with pressurized gas. The operation of the devices shown in FIGS. 2 and 4 are otherwise the same in principle and meet the object described above.

The embodiments illustrated in the drawing are only possible examples. Other embodiments for mounting the chisel-type knife in a resilient manner may include elastomers as they are known for spring-like support and damping of moving masses, combinations of gaseous media and hydraulic media, as they are known in piston reservoirs in hydraulic plants, etc.

FIG. 5 schematically shows the alternative embodiment of the invention which has already been discussed above. The knife drum 6 has a chisel-type knife 2 which is mounted in a non-resilient manner and which interacts with the anvil 24 of the anvil drum 7 for cutting the rolled strip 4 with a severing cut when the adjusting device 36 is appropriately adjusted. Since the eccentric adjusting members 22, 23 of the adjusting device 36 describe an unchanging eccentric path, a protruding dimension Ü of the chisel-type knife 2 relative to the anvil 24 would be required for achieving a cutting gap of the size zero. This would inevitably lead to a spontaneous increase of the force acting between the knife cutting edge 3 and the anvil 24 and, thus, the entire adjusting device 36 including the bearings of the eccentric members, the drums and the hinges 27, 28 at the links 25, 26. For example, in order to prevent an overloading of all structural elements in accordance with the teaching of the present invention by supporting the chisel-type knife against a spring element with a predeterminable restoring force, the link 25 is supported with its hinge 28 resiliently against the spiral spring 30 which is shown as an example. The spring strut 29 serves to effect a linear guidance in the guide element 32 and the movement of the spring strut 29 is limited downwardly by the adjusting screw 32.

For putting into effect the resilient support of the chisel-type knife 1 in the cutting position in accordance with the teaching of the present invention, it is not absolutely required that the elements exerting the restoring force are present directly in the knife drum 6. Rather, it is within the discretion of those skilled in the art to select equivalent available means in the form of a suitable spring element to be integrated also in other components of the high-speed shear, such as, for example, in the adjusting device according to FIG. 5. In principle, it would also be possible to mount other structural components of the adjusting device so as to be resiliently supported and to use for this purpose, for example, the bearings of the drums 6, 7 or the eccentric adjusting members 22, 23 or the links 27, 28. It must be ensured in all cases that the forces acting between the chisel-type knife 2 and the anvil 24 do not exceed a predetermined maximum.

Figure 6:
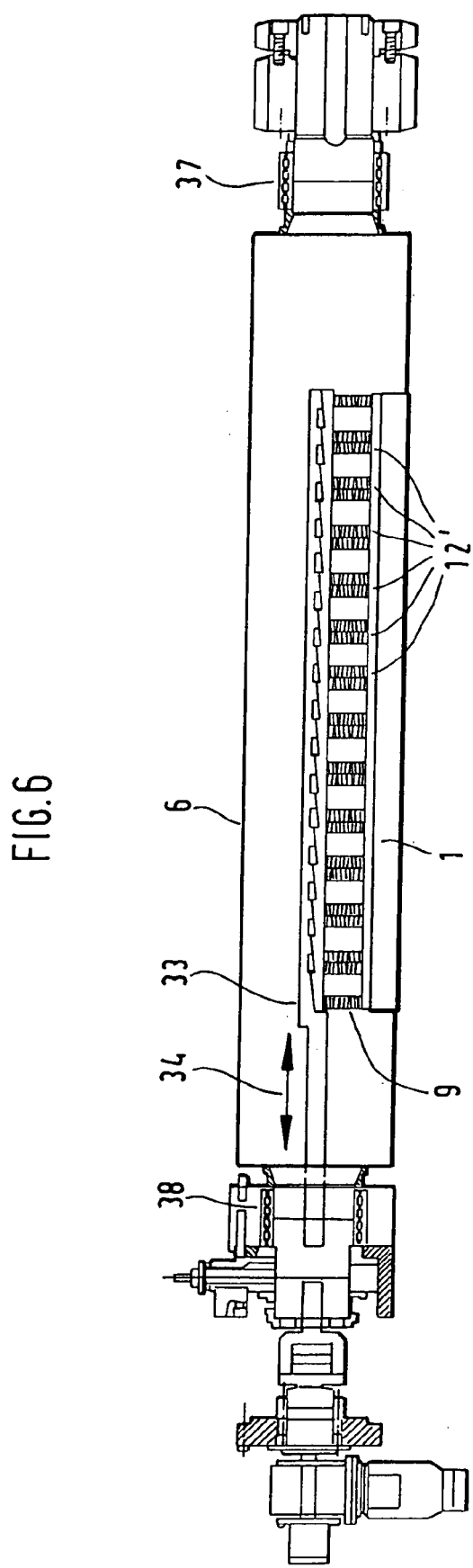
FIG. 6 is a side view, partially in section, of a chisel-type knife of a knife drum supported by a plurality of resilient support elements.

FIG. 6 shows another alternative embodiment of the present invention. A chisel-type knife 1 is mounted in the knife drum 6 in a radial guide means 9. For achieving the necessary cutting force the chisel-type knife 1 is resiliently mounted in radial direction by means of a row of plate spring stacks 12'. By means of an adjusting mechanism 33 using a number of clamped wedges with inclined wedge surfaces, the spring pretension and, thus, the spring travel distance and the spring progression can be changed by means of the adjusting distance 34. The drums 6 are supported in loose bearings 37, 38 on both sides by means of cylindrical roller bodies. In order to achieve a uniform wear, the knife drum 6 can be moved back and forth in axial direction with a slight axial degree of freedom.

Figure 7:
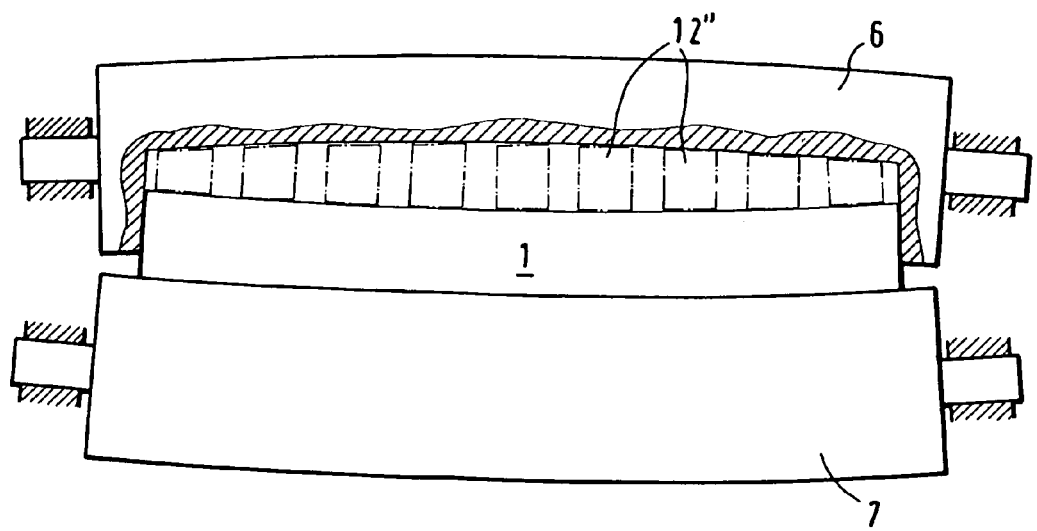
FIG. 7 is a schematic illustration of the knife drum and the anvil drum with an elastic chisel-type knife, wherein the drums are deformed by the load.
Figure 8:
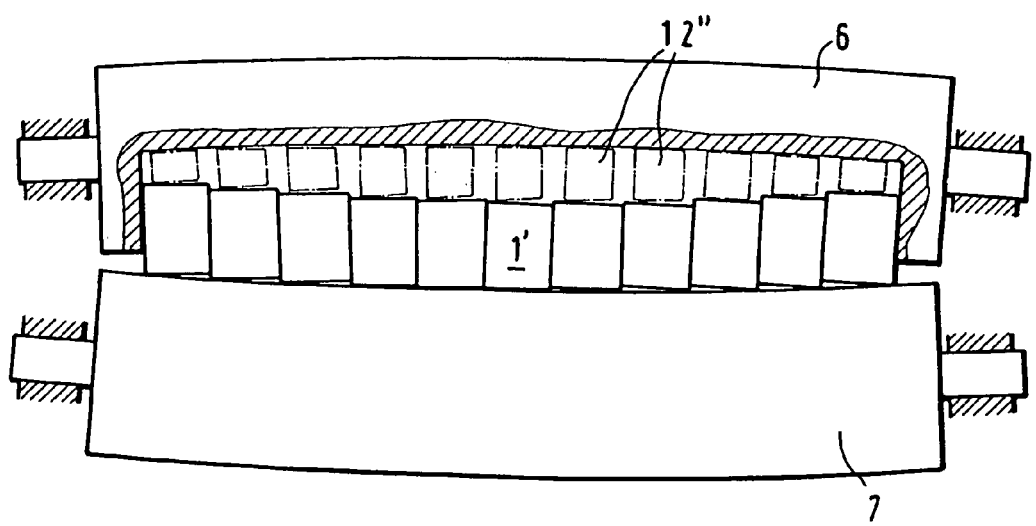
FIG. 8 is a schematic illustration similar to FIG. 7, showing a segmented chisel-type knife.

In order to achieve a constant cutting force over the strip width the chisel-type knife 1 shown in FIG. 7 has a low bending stiffness. Alternatively, as shown in FIG. 8, the knife may be segmented into knife segments 1'. This makes it possible to adapt the chisel-type knife to the deformation of the knife drum 6 and the anvil drum 7. In order to illustrate this principle, the deformations of the knife drum 6 and the anvil drum 7 are shown significantly exaggerated.

The resilient support 12 in the form of segments can also be provided on the anvil drum 7 instead of on the knife 1. The principle of the knife resiliently supported by segments can also be utilized, for example, as overload protection in other shears which do not have chisel-type knives but "real" cutting knives.

The present invention improves in an optimum manner a high-speed shear to make it possible to achieve clean cuts without overloading structural components of the shear, especially at speeds of the rolled strip to be cut of up to 30 m/sec. to While specific embodiments of the invention have been shown and described in detail to illustrate the inventive principles, it will be understood that the invention may be embodied otherwise without departing from such principles.

We claim:

1. A high-speed shear for transverse cutting steel strip, comprising a knife drum and a counter-drum located opposite the knife drum, at least one knife having a knife cutting edge mounted on the knife drum, the counterdrum having a surface portion acting as an anvil and interacting with the knife, at least one drive unit for accelerating the drums to a speed corresponding to a feeding speed of a rolled strip to be cut, and at least one of the drums having a separate adjusting device for adjusting the drums relative to each other for carrying out a cut, the knife drum having a cutting circle, wherein the knife is mounted so as to protrude beyond the cutting circle towards the anvil of the counter-drum, and wherein the knife drum with the unyieldingly supported knife is mounted on a link, the knife drum with the yieldingly held link, which cooperates with the adjusting device, being supported against a spring element with a predeterminable restoring force.

* * * * *